United States Patent
Chavez et al.

(10) Patent No.: US 10,743,129 B2
(45) Date of Patent: *Aug. 11, 2020

(54) VEHICLE OCCUPANT POSITION DETERMINATION

(71) Applicant: INTERNATIONAL BUSINESS MACHINES CORPORATION, Armonk, NY (US)

(72) Inventors: Lisa M. Chavez, Tucson, AZ (US); Rhonda L. Childress, Austin, TX (US); David B. Kumhyr, Austin, TX (US); Michael J. Spisak, East Northport, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/547,815

(22) Filed: Aug. 22, 2019

(65) Prior Publication Data

US 2019/0379998 A1 Dec. 12, 2019

Related U.S. Application Data

(63) Continuation of application No. 16/204,238, filed on Nov. 29, 2018, now Pat. No. 10,595,155, which is a
(Continued)

(51) Int. Cl.
*H04W 4/02* (2018.01)
*H04W 4/40* (2018.01)
(Continued)

(52) U.S. Cl.
CPC .............. *H04W 4/02* (2013.01); *G01S 19/14* (2013.01); *H04W 4/40* (2018.02); *H04W 4/44* (2018.02)

(58) Field of Classification Search
CPC . H04W 4/02; H04W 4/40; H04W 4/44; G01S 19/14
See application file for complete search history.

(56) References Cited

U.S. PATENT DOCUMENTS 8,914,014 B2 * 12/2014 Vidal .................... H04W 4/025
455/418
9,078,116 B2 * 7/2015 Abramson .............. H04W 4/14
(Continued)

FOREIGN PATENT DOCUMENTS

| WO | 2012067814 | 5/2012 |
|----|------------|--------|
| WO | 2013079485 | 6/2013 |
| WO | 2013103727 | 7/2013 |

OTHER PUBLICATIONS

Anonymous; Method and System to Assist Contact with Others within Close Proximity using Global Positioning System (GPS) Information from Mobile Device; IP.com; IPCOM000228573D; Jun. 19, 2013; 4 pages.
(Continued)

*Primary Examiner* — Mohamed Charioui
*Assistant Examiner* — Eyob Hagos
(74) *Attorney, Agent, or Firm* — Schmeiser, Olsen & Watts; Brian M. Restauro

(57) ABSTRACT

A method and system for determining a driver is provided. The method includes receiving and analyzing GPS data identifying locations of GPS enabled devices of a plurality of users. A group of users are determined to be located within a specified proximity to each other based on the analysis. The group of users are determined, based on an altitude, velocity, and a vector of the group of users, to be located within a vehicle. A position and role for each user with respect to the vehicle is determined. Selected functions of each GPS enabled device are controlled based on each role.

20 Claims, 9 Drawing Sheets

Related U.S. Application Data continuation of application No. 15/696,283, filed on Sep. 6, 2017, now Pat. No. 10,171,954, which is a continuation of application No. 14/189,028, filed on Feb. 25, 2014, now Pat. No. 9,860,708.

(51) Int. Cl.
    *G01S 19/14*     (2010.01)
    *H04W 4/44*     (2018.01)

(56) References Cited

U.S. PATENT DOCUMENTS

| | | | |
|---|---|---|---|
| 9,860,708 B2 | 1/2018 | Chavez | |
| 10,171,954 B2 | 1/2019 | Chavez | |
| 2007/0072553 A1* | 3/2007 | Barbera | H04M 1/72569 455/67.11 |
| 2011/0301780 A1* | 12/2011 | Miller | H04M 1/6075 701/1 |
| 2012/0214463 A1* | 8/2012 | Smith | H04M 1/72577 455/418 |
| 2012/0329444 A1* | 12/2012 | Osann, Jr. | H04M 1/67 455/418 |
| 2013/0142384 A1 | 6/2013 | Ofek | |
| 2014/0364153 A1* | 12/2014 | Ren | G01S 19/14 455/456.4 |
| 2015/0241565 A1 | 8/2015 | Chavez et al. | |
| 2017/0366946 A1 | 12/2017 | Chavez | |
| 2019/0098440 A1 | 3/2019 | Chavez | |

OTHER PUBLICATIONS

Baker, Scott; Feds Look at Technology to Disable Your Cell Phone in Your Car; The Blaze; Nov. 16, 2010; 1 page.

Friedman, Mark J.; List of IBM Patents or patent Applications Treated as Related; Aug. 22, 2019; 1 page.

IBM; System, Method and Apparatus to Coordinate Transportation from Mobile Phone Coordinates Among a Plurality of Mobile Phone Users; IP.com; IPCOM000143501D; Nov. 27, 2006; 4 pages.

Rogers, Christina; Automakers should disable technologies that distract drivers, U.S. says; AutoWeek.com; Feb. 17, 2012; 3 pages.

* cited by examiner

| Data MIN | Latitude Degrees | Minutes | Seconds | Longitude Degrees | Minutes |
|---|---|---|---|---|---|
| 7240501526 | 30 | 11 | 25.4358 | −97 | 52 |
| 9317751244 | 30 | 11 | 25.4358 | −97 | 52 |
| 1025471964 | 30 | 11 | 25.4359 | −97 | 52 |
| 9992716968 | 30 | 11 | 25.2846 | −97 | 52 |
| 1663405476 | 30 | 11 | 25.2846 | −97 | 52 |
| 2503236785 | 30 | 11 | 25.2846 | −97 | 52 |
| 0899879698 | 30 | 11 | 24.2844 | −97 | 52 |
| 5501759079 | 30 | 11 | 24.2846 | −97 | 52 |
| 3392999020 | 30 | 11 | 24.2846 | −97 | 52 |
| 5948917246 | 30 | 11 | 24.2846 | −97 | 52 |
| 4241080193 | 30 | 11 |  | −97 | 52 |
| 9468402777 | 30 | 11 |  | −97 | 52 |
| 4527273162 | 30 | 11 | s | −97 | 52 |
| 1064155649 | 30 | 11 | i | −97 | 52 |
| 5697672454 | 30 | 11 | m | −97 | 52 |
| 8284431224 | 30 | 11 | i | −97 | 52 |
| 4595173728 | 30 | 11 | l | −97 | 52 |
| 2954602543 | 30 | 11 | a | −97 | 52 |
| 4566694452 | 30 | 11 | r | −97 | 52 |
| 7799554951 | 30 | 11 |  | −97 | 52 |
| 6126158281 | 30 | 11 | w | −97 | 52 |
| 1889111707 | 30 | 11 | i | −97 | 52 |
| 9347631447 | 30 | 11 | t | −97 | 52 |
| 5214287413 | 30 | 11 | h | −97 | 52 |
| 4039013025 | 30 | 11 |  | −97 | 52 |
| 0823233164 | 30 | 11 | a | −97 | 52 |
| 9707634078 | 30 | 11 |  | −97 | 52 |
| 3007537017 | 30 | 11 | v | −97 | 52 |
| 5750740681 | 30 | 11 | e | −97 | 52 |
| 0856454361 | 30 | 11 | c | −97 | 52 |
| 1568909915 | 30 | 11 | t | −97 | 52 |
| 8269601849 | 30 | 11 | o | −97 | 52 |
| 6195409704 | 30 | 11 | r | −97 | 52 |
| 5530154079 | 30 | 11 |  | −97 | 52 |

|  | Calculated | | | Interference | |
| --- | --- | --- | --- | --- | --- |
| Minutes | Vector | Speed Current | Peak | Average | Operator |
| 23.7246 | 045° | 56 | 63 | 50 | T |
| 23.7246 | 044° | 56 | 63 | 50 | F |
| 23.4704 | 045° | 58 | 67 | 52 | T |
| 23.4704 | 046° | 58 | 67 | 52 | F |
| 23.4704 | 045° | 58 | 67 | 52 | F |
| 23.4704 | 047° | 7 | 12 | 6 | T |
| 23.4704 | 045° | 55 | 61 | 48 | T |
| 23.4705 | 045° | 55 | 61 | 48 | F |
| 23.4706 | 045° | 55 | 61 | 48 | F |
| 23.4706 | 045° | 55 | 61 | 48 | F |
|  | 045° | 55 | 61 | 48 | F |
|  | 047° | 54 | 60 | 47 | F |
| s | 045° | 55 | 61 | 48 | F |
| i | 045° | 55 | 61 | 48 | F |
| m | 045° | 55 | 61 | 48 | F |
| i | 045° | 55 | 61 | 48 |  |
| l | 045° | 55 | 61 | 48 | F |
| a | 045° | 55 | 61 | 48 | F |
| r | 044° | 56 | 62 | 49 | F |
|  | 225° | 70 | 70 | 63 | F |
| w | 225° | 70 | 70 | 63 | F |
| i | 225° | 70 | 70 | 63 | F |
| t | 225° | 70 | 70 | 63 | F |
| h | 225° | 71 | 71 | 63 | F |
|  | 225° | 70 | 70 | 63 | F |
| a | 225° | 70 | 70 | 63 | F |
|  | " | " | " | " | " |
| v | " | " | " | " | " |
| e | " | " | " | " | " |
| c | " | " | " | " | " |
| t | 315° | 35 | 35 | 25 | T |
| o | 315° | 35 | 35 | 25 | T |
| r |  |  |  |  |  |
|  |  |  |  |  |  |

FIG 6B

| Corrected Path | Convenience | Connection to figure 5 |
|---|---|---|
| MOPAC Expwy N | Motor vehicle 2 passengers | Cluster 4  508a |
| MOPAC Expwy N | Motor vehicle 2 passengers | Cluster 4  508a |
| MOPAC Expwy N | Motor vehicle 3 passengers | Cluster 4  508b |
| MOPAC Expwy N | Motor vehicle 3 passengers | Cluster 4  508b |
| MOPAC Expwy N | Motor vehicle 3 passengers | Cluster 4  508b |
| MOPAC Expwy N | Bicycle on road shoulder | Cluster 4  508c |
| MOPAC Expwy N | Motor vehicle, bus | Cluster 4  508d |
| MOPAC Expwy N | Motor vehicle, bus | Cluster 4  508d |
| MOPAC Expwy N | Motor vehicle, bus | Cluster 4  508d |
| MOPAC Expwy N | Motor vehicle, bus | Cluster 4  508d |
| MOPAC Expwy N | Motor vehicle, bus | Cluster 4  508d |
| MOPAC Expwy N | Motor vehicle, bus | Cluster 4  508d |
| MOPAC Expwy N | Motor vehicle, bus | Cluster 4  508d |
| MOPAC Expwy N | Motor vehicle, bus | Cluster 4  508d |
| MOPAC Expwy N | Motor vehicle, bus | Cluster 4  508d |
| MOPAC Expwy N | Motor vehicle, bus | Cluster 4  508d |
| MOPAC Expwy N | Motor vehicle, bus | Cluster 4  508d |
| MOPAC Expwy N | Motor vehicle, bus | Cluster 4  508d |
| MOPAC Expwy N | Motor vehicle, bus | Cluster 4  508d |
| MOPAC commuter rail | Commuter rail engine | Cluster 5  508e |
| MOPAC commuter rail | Commuter rail pass.Car | Cluster 5  508e |
| MOPAC commuter rail | Commuter rail pass.Car | Cluster 5  508e |
| MOPAC commuter rail | Commuter rail pass.Car | Cluster 5  508e |
| MOPAC commuter rail | Commuter rail pass.Car | Cluster 5  508e |
| MOPAC commuter rail | Commuter rail pass.Car | Cluster 5  508e |
| MOPAC commuter rail | Commuter rail pass.Car | Cluster 5  508e |
| MOPAC commuter rail | " | Cluster 5  508e |
| " | " | " |
| " | " | " |
| " | " | " |
| Lacross Ave WB | Motor vehicle 1 passenger | Cluster 6  508f |
| Lacross Ave WB | Motor vehicle 1 passenger | Cluster 7  508g |
| | | |
| | | |

FIG 6C

VEHICLE OCCUPANT POSITION DETERMINATION

CROSS REFERENCE TO RELATED APPLICATIONS

This application is a continuation application claiming priority to Ser. No. 16/204,238 filed Nov. 29, 2018 which is a continuation application claiming priority to Ser. No. 15/696,283 filed Sep. 6, 2017 now U.S. Pat. No. 10,171,954 issued Jan. 1, 2019 which is a continuation application claiming priority to Ser. No. 14/189,028 filed Feb. 25, 2014 now U.S. Pat. No. 9,860,708 issued Jan. 2, 2018, the contents of which are hereby incorporated by reference.

FIELD

The present invention relates generally to a method for determining positions of vehicle occupants with respect to a vehicle and in particular to a method and associated system for using the determined positions to control selected functions of associated devices.

BACKGROUND

Identifying device users typically includes an inaccurate process with little flexibility. Preventing access to a user device based on an identification process may include a complicated process that may be time consuming and require a large amount of resources. Accordingly, there exists a need in the art to overcome at least some of the deficiencies and limitations described herein above.

SUMMARY

A first aspect of the invention provides a method comprising: receiving, by a computer processor of a computing system from a plurality of GPS enabled devices of a plurality of users, GPS data identifying locations of the GPS enabled devices; analyzing, by the computer processor, the GPS data; determining, by the computer processor based on results of the analyzing, a group of users of the plurality of users located within a specified proximity to each other user of the group of users; determining, by the computer processor based on an altitude, velocity, and a vector of the group of users, that the group of users is located within a vehicle; determining, by the computer processor based on the results of the analyzing, a position of each user of the group of users with respect to the vehicle; determining, by the computer processor based on each the position, roles for the group of users with respect to the vehicle; and controlling, by the computer processor based the roles, selected functions of each GPS enabled device of the GPS enabled devices.

A second aspect of the invention provides a computing system comprising a computer processor coupled to a computer-readable memory unit, the memory unit comprising instructions that when executed by the computer processor implements a method comprising: receiving, by the computer processor from a plurality of GPS enabled devices of a plurality of users, GPS data identifying locations of the GPS enabled devices; analyzing, by the computer processor, said GPS data; determining, by the computer processor based on results of the analyzing, a group of users of the plurality of users located within a specified proximity to each other user of the group of users; determining, by the computer processor based on an altitude, velocity, and a vector of the group of users, that the group of users is located within a vehicle; determining, by the computer processor based on the results of the analyzing, a position of each user of the group of users with respect to the vehicle; determining, by the computer processor based on each the position, roles for the group of users with respect to the vehicle; and controlling, by the computer processor based the roles, selected functions of each GPS enabled device of the GPS enabled devices.

A third aspect of the invention provides a computer program product, comprising a computer readable hardware storage device storing a computer readable program code, the computer readable program code comprising an algorithm that when executed by a computer processor of a computer system implements a method, the method comprising: receiving, by the computer processor from a plurality of GPS enabled devices of a plurality of users, GPS data identifying locations of the GPS enabled devices; analyzing, by the computer processor, the GPS data; determining, by the computer processor based on results of the analyzing, a group of users of the plurality of users located within a specified proximity to each other user of the group of users; determining, by the computer processor based on an altitude, velocity, and a vector of the group of users, that the group of users is located within a vehicle; determining, by the computer processor based on the results of the analyzing, a position of each user of the group of users with respect to the vehicle; determining, by the computer processor based on each the position, roles for the group of users with respect to the vehicle; and controlling, by the computer processor based the roles, selected functions of each GPS enabled device of the GPS enabled devices.

The present invention advantageously provides a simple method and associated system capable of identifying device users.

BRIEF DESCRIPTION OF THE SEVERAL VIEWS OF THE DRAWINGS

FIG. 6, including FIGS. 6A-6C, illustrates a chart comprising GPS data within an inference cache, in accordance with embodiments of the present invention.

DETAILED DESCRIPTION

Figure 1:
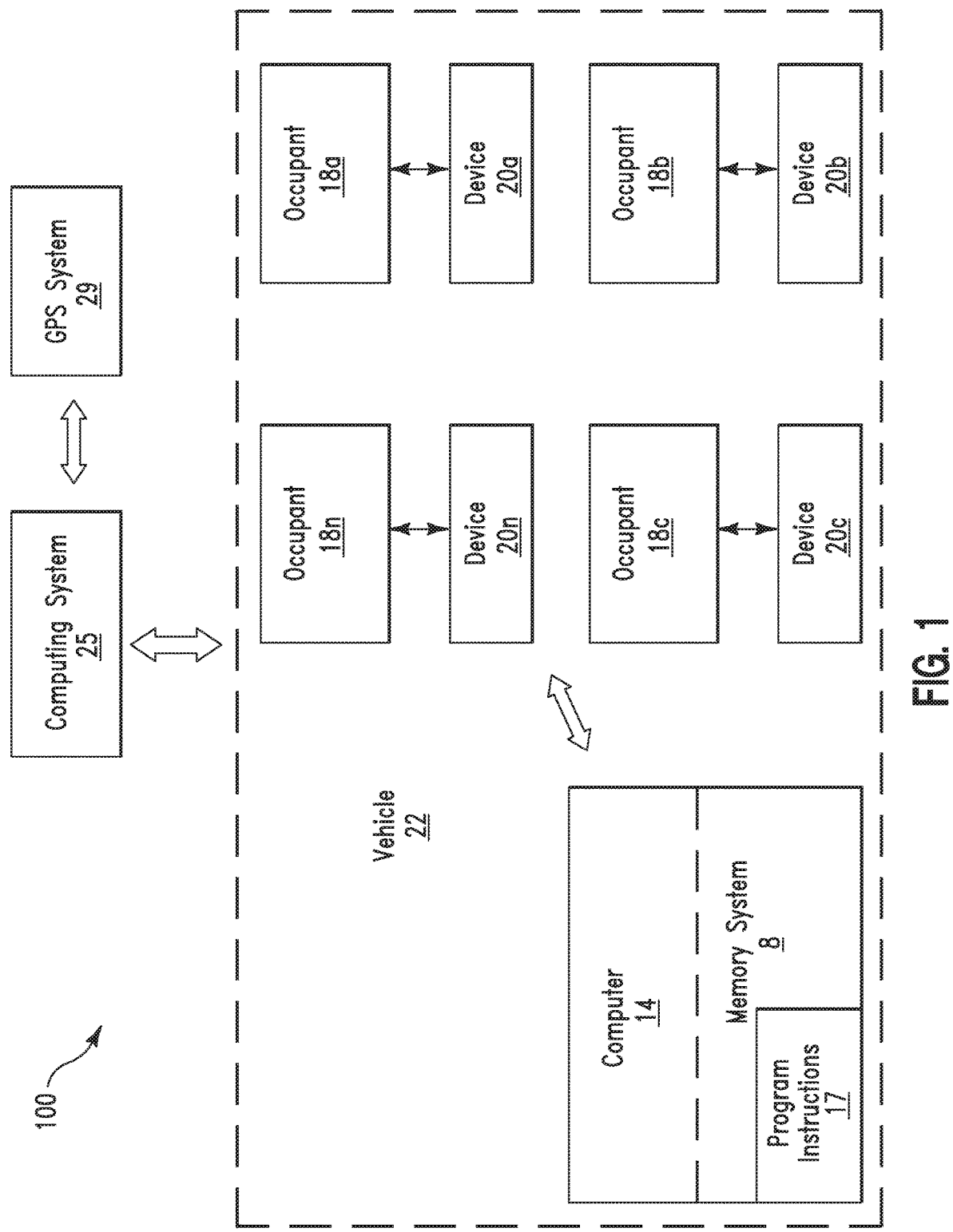
FIG. 1 illustrates a system 100 for identifying clusters of devices and determining that the devices are within a same vehicle, in accordance with embodiments of the present invention.

FIG. 1 illustrates a system 100 for identifying clusters of devices 20 ... 20n and determining that the devices 20a ... 20n are within a same vehicle 22, in accordance with embodiments of the present invention. Devices 20a ... 20n may comprise global positioning satellite (GPS) devices, mobile computing devices, smart phones, etc. System 100 identifies a cluster of devices (e.g., devices 20a ... 20n) and calculates a position, speed, and direction of each device. The calculations are used to determine that each device is associated with one or more end users (e.g., occupants 18a ... 18n) that are traveling together within a vehicle (e.g., vehicle 22). Additionally, the calculations may be used to determine which of the end users is a driver of the vehicle (e.g., occupant 18a).

System 100 of FIG. 1 includes a computing system 25 and a GPS system 29 communicatively connected to a vehicle 22. The vehicle 22 includes a computer 14, occupants 18a ... 18n, and associated devices 20a ... 20n (e.g., driver distraction devices). Computer 14 is communicably connected to devices 20a ... 20n, computing system 25 and/or GPS system 29. Computer 14 may include any type of computing system(s) including, inter alia, an automobile integrated computer, a computer (PC), a laptop computer, a tablet, etc. Memory system 8 stores program instructions 17 for communicating with computing system 25 and or GPS system 29 (in communications with a GPS), identifying devices 20 ... 20n, determining the devices 20a ... 20n are within a same vehicle 22, and identifying a driver of the vehicle 22. Alternatively, devices 20a ... 20n may directly communicate with computing system 25 and or GPS system 29 for identifying devices 20 ... 20n, determining the devices 20a ... 20n are within a same vehicle 22, and identifying a driver of the vehicle 22.

System 100 identifies GPS enabled communications devices in a small area (e.g., occupants of a vehicle), associates the GPS enabled communications devices by device characteristics and GPS coordinated, speed and direction of movement, and identifies a device that is associated with a driver of the vehicle. The aforementioned process is initiated when a local communications receiver (e.g., computing system 25 and/or GPS system 29) aggregates GPS coordinates (of the devices) to locate clusters of co-located devices (i.e., in a confined area). The clusters are compared for relative speed and direction to further identify devices that are determined to be travelling together (e.g., in a same vehicle). Each verified cluster is examined for a relative position and direction in the cluster. A driver position as well as alternative positions are considered and roles for each device in the cluster are determined.

Figure 2:
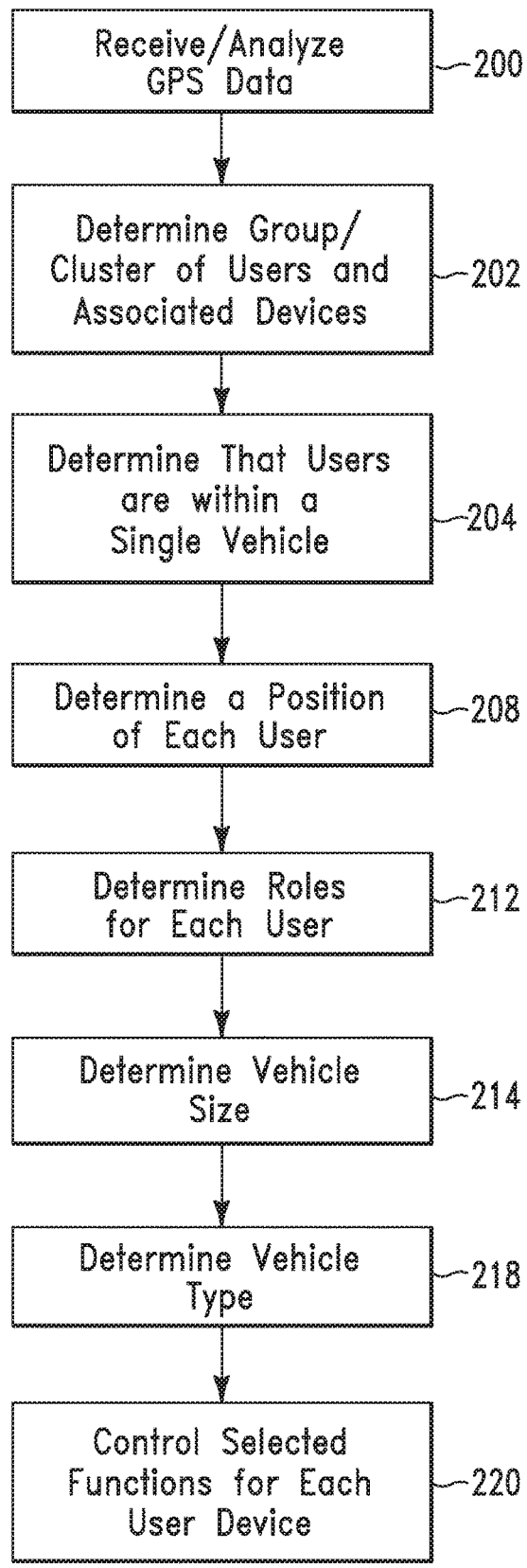
FIG. 2 illustrates an algorithm detailing a process flow enabled by the system of FIG. 1 for identifying clusters of devices and determining that the devices are within a same vehicle, in accordance with embodiments of the present invention.

FIG. 2 illustrates an algorithm detailing a process flow enabled by system 2 of FIG. 1 for identifying devices and determining the associated users are located within a same vehicle, in accordance with embodiments of the present invention. Each of the steps in the algorithm of FIG. 2 may be enabled and executed in any order by a computer processor executing computer code. In step 200, GPS data (identifying locations of GPS enabled devices associated with specified users) and/or coordinates is received (e.g., by a computing system 25 and/or GPS system 29 of FIG. 1) from the GPS enabled devices. The GPS data is analyzed. In step 202, a group of users are determined based on results of the analyses on step 200. Each user of the group of users are determined to be located within a specified proximity to each other. In step 204, it is determined (based on results of step 202, and an altitude, velocity, and a vector of the group of users) that the group of users is located within a single vehicle. In step 208, a position of each user (with respect to the vehicle) is determined. In step 212, roles for each user with respect to the vehicle are determined based on each position. The roles may include, inter alia, a driver, a passenger, an instructor, etc. In optional step 214, a size of the vehicle is determined based on a number of users in the group of users and each position of each user. In optional step 218, a type (e.g., a vehicle model, vehicle type such as compact, SUV, etc.) of the vehicle is determined based on a number of users in the group of users, each position of each user, and the size of the vehicle. In step 220, selected functions of each GPS enabled device are controlled based on an associated role of an associated user. For example, a role of a first user may indicate a driver (of the vehicle) role and controlling the functions may include modifying user control functions of the associated GPS enabled device or disabling the associated GPS enabled device.

Figure 3:
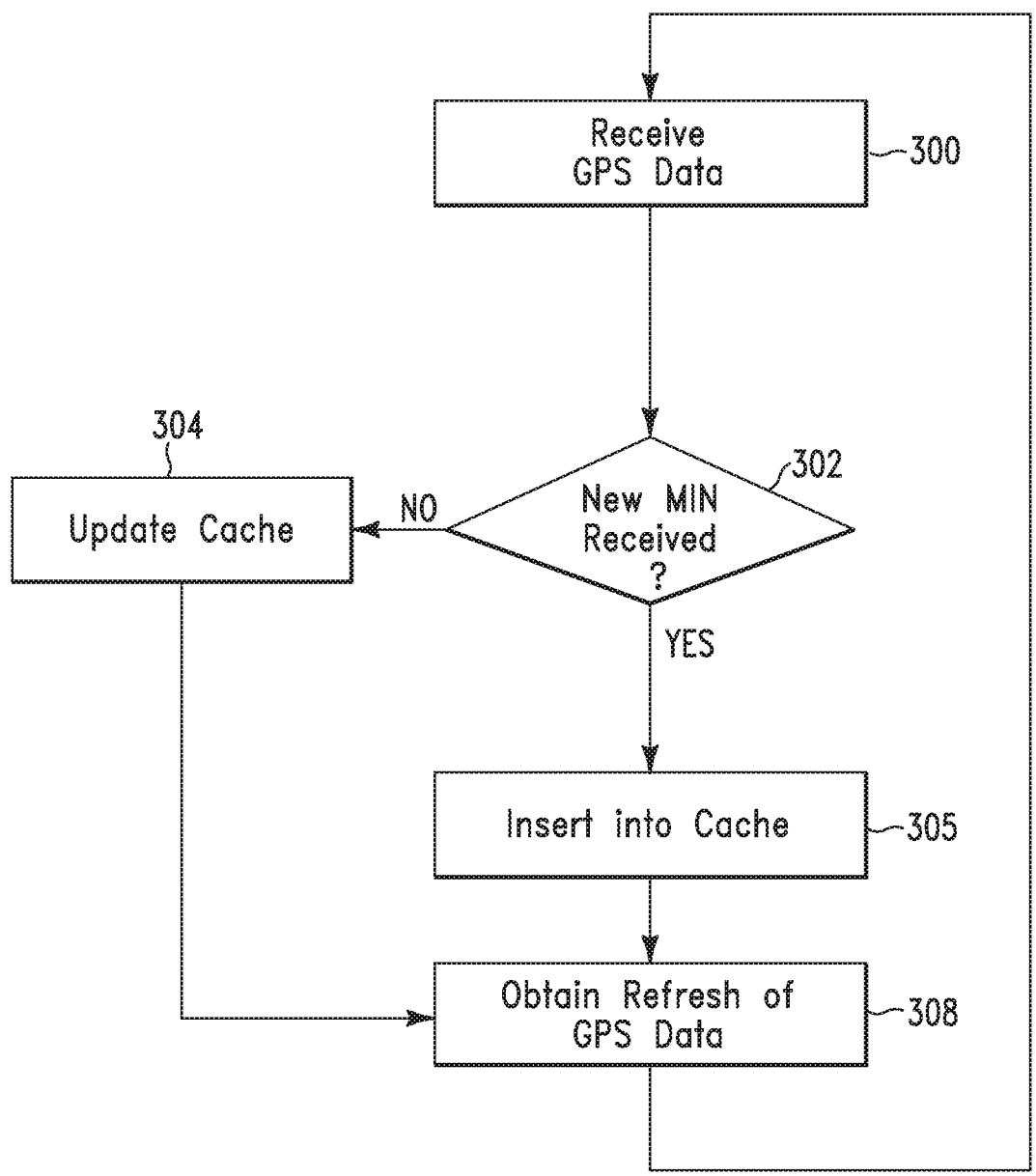
FIG. 3 illustrates an algorithm detailing a process flow enabled by the system of FIG. 1 for updating GPS data within an inference cache for analyses, in accordance with embodiments of the present invention.

FIG. 3 illustrates an algorithm detailing a process flow enabled by system 100 of FIG. 1 for updating GPS data within an inference cache for analyses, in accordance with embodiments of the present invention. An inference cache may be comprised by computing system 25 and/or computer 14 of FIG. 1. In step 300, GPS data is received by the inference cache. In step 302, it is determined if a new mobile identification number (MIN) has been received by the computer. A MIN or a mobile subscription identification number (MSIN) comprises a unique 10-digit number used by a wireless carrier to identify a specific mobile phone. A MIN comprises a number that identifies a mobile phone working under TIA standards for cellular and PCS technologies. (e.g., EIA/TIA-553 analog, IS-136 TDMA, IS-95, IS-2000 CDMA, etc.). A MIN comprises a number derived from a 10-digit directory telephone number assigned to a mobile station. Rules for deriving the MIN from the 10-digit telephone number are defined in the IS-95 standard. MIN1 comprises a first or least significant 24 binary digits of the MIN. MIN2 comprises a second part of the MIN containing the 10 most significant binary digits. MIN1, an ESN, and additional other digital input are used during an authentication process. The MIN is used to identify a mobile station. If in step 302, it is determined that a new mobile identification number (MIN) has been received by the computer then in step 305, the MIN is inserted into the inference cache and in step 308, a refresh of the GPS data is obtained. If in step 302, it is determined that a new mobile identification number (MIN) has not been received by the computer then in step 304, the inference cache is updated and in step 308, a refresh of the GPS data is obtained.

Figure 4:
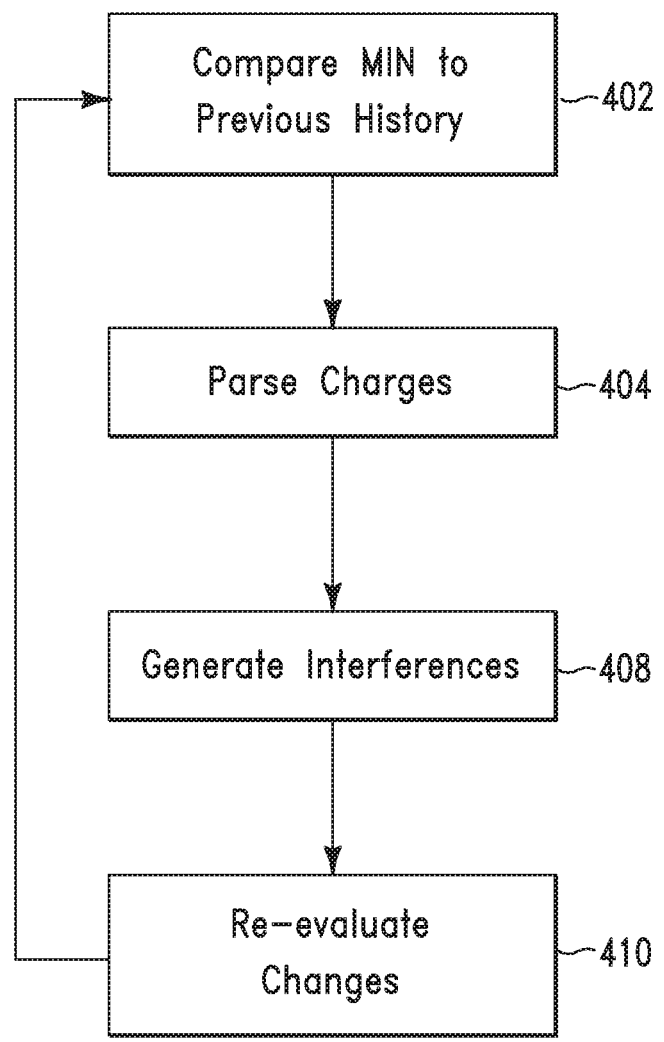
FIG. 4 illustrates an algorithm detailing a process flow enabled by the system of FIG. 1 for parsing GPS data within an inference cache for analyses, in accordance with embodiments of the present invention.

FIG. 4 illustrates an algorithm detailing a process flow enabled by system 100 of FIG. 1 for parsing GPS data within an inference cache for analyses, in accordance with embodiments of the present invention. In step 402, a newly retrieved MIN (e.g., as described with respect to steps 302 and 305 in FIG. 3) and associated GPS data is compared to a previous history of GPS data. In step 404, any determined changes between the newly retrieved MIN and the previous history of GPS data are parsed. In step 408, inferences from the changes are determined. For example, similar devices may be clustered by averages of speed and direction. Additionally, a size of an associated vehicle may be inferred based on a direction, location, and number of devices. In step 410, the changes are reevaluated and step 402 is repeated.

Figure 5:
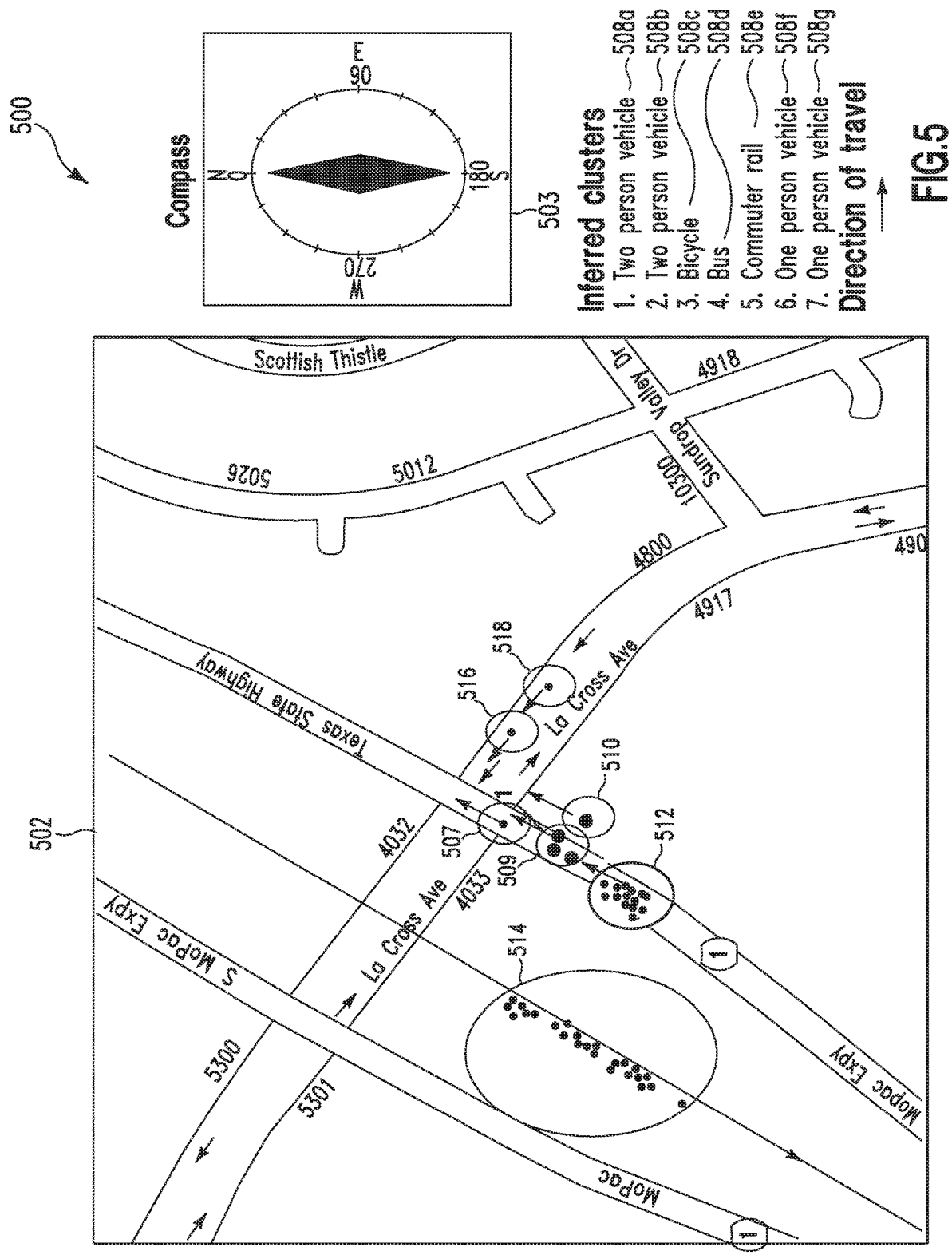
FIG. 5 illustrates a GUI identifying a graphical map illustrating clusters of users and associated devices on specified routes of travel, in accordance with embodiments of the present invention.

FIG. 5 illustrates a GUI 500 identifying a graphical map 502 illustrating clusters 508a . . . 508g of users (in vehicles) and associated devices on specified routes of travel, in accordance with embodiments of the present invention. Additionally, GUI 500 presents a compass for displaying a direction of travel. Cluster 508a comprises a cluster of two users (or occupants) in a vehicle (e.g., a car). Cluster 508b comprises a cluster of 3 users (or occupants) in a vehicle (e.g., a car). Cluster 508c comprises a cluster of one user (or occupants) on a bicycle. Cluster 508d comprises a cluster of multiple users (or occupants) in a bus. Cluster 508e comprises a cluster of multiple users (or occupants) in a commuter rail. Each of clusters 508f and 508g comprises a cluster of one user (or occupant) in a vehicle (e.g., a car). Roles for each user of the clusters 508a . . . 508g may be determined via the algorithms of FIGS. 2-4 and as described, supra.

FIG. 6, including FIGS. 6A-6C, illustrates a chart 600 comprising GPS data within an inference cache, in accordance with embodiments of the present invention. The GPS data identifies MINS for devices and associated clusters 508a . . . 508g of FIG. 5. Chart 600 additionally identifies locations (e.g., latitude and longitude), vectors, speeds, and inferences related to each of clusters 508a . . . 508g.

Figure 7:
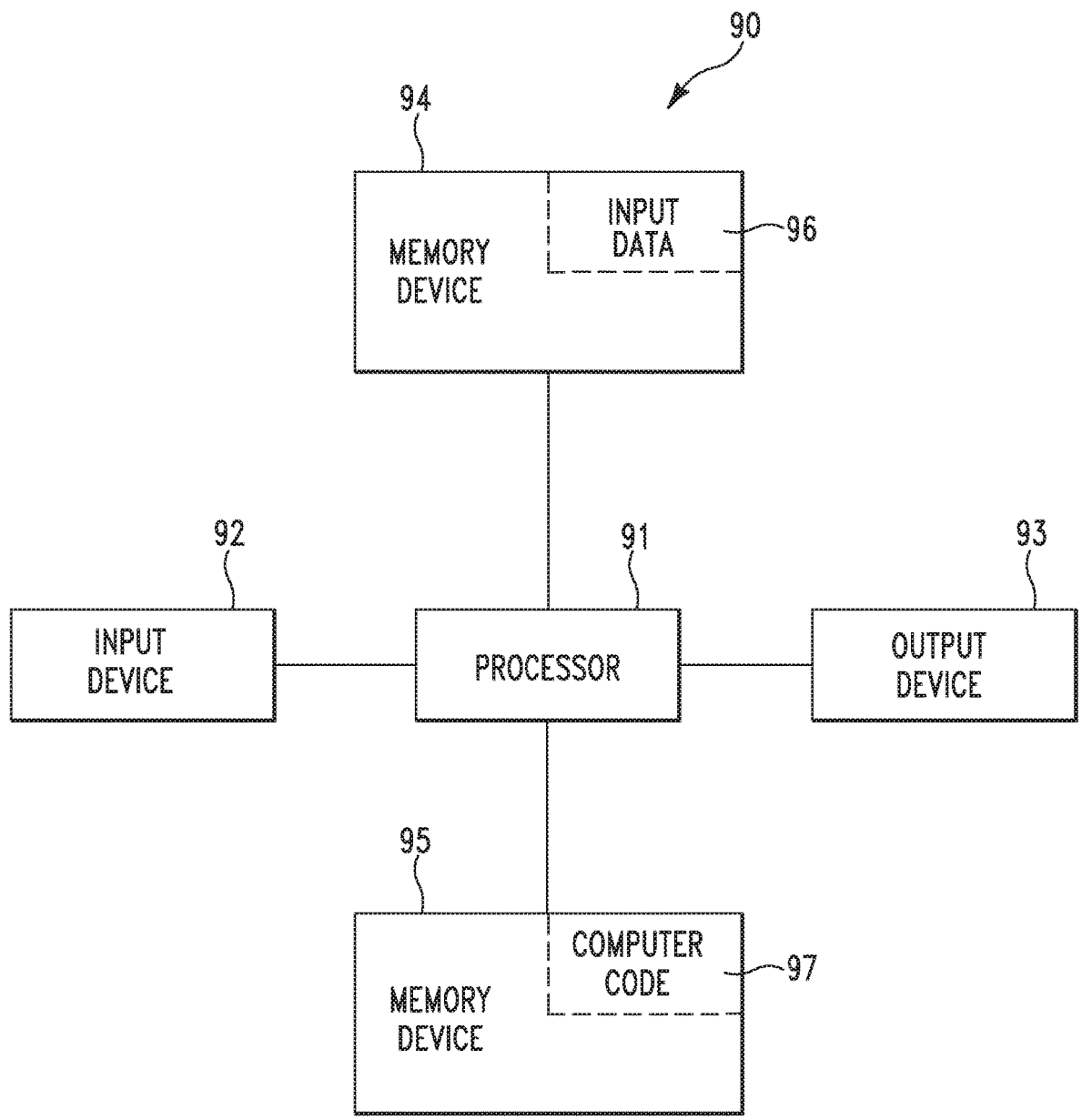
FIG. 7 illustrates a computer apparatus used by the system of FIG. 1 for identifying clusters of devices and determining that the devices are within a same vehicle, in accordance with embodiments of the present invention.

FIG. 7 illustrates a computer system 90 used by system 100 of FIG. 1 for identifying clusters of devices and determining that the devices are within a same vehicle, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 7 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for reducing unauthorized device or account access lockouts or memory resets. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 7) may include the algorithms of FIGS. 2-4 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

Still yet, any of the components of the present invention could be created, integrated, hosted, maintained, deployed, managed, serviced, etc. by a service supplier who offers to identify clusters of devices and determine that the devices are within a same vehicle. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for identifying clusters of devices and determining that the devices are within a same vehicle. In another embodiment, the invention provides a business method that performs the process steps of the invention on a subscription, advertising, and/or fee basis. That is, a service supplier, such as a Solution Integrator, could offer to reduce unauthorized device or account access lockouts or memory resets. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A device identification and modification method comprising:
    receiving, via a computer processor of a computing system by a cache of said computing system from a plurality of GPS enabled devices of a plurality of users, GPS data identifying locations of said GPS enabled devices, where said computing system comprises an integrated computer within a vehicle;
    identifying, by said computer processor based on digital identification input inserted into said cache, each GPS enabled device of said GPS enabled devices;
    refreshing, by said computer processor based on said digital identification input within said cache, said GPS data resulting in updated GPS data identifying updated locations of said GPS enabled devices;
    determining, by said computer processor based on said updated GPS data within said cache and locations of said GPS enabled devices, a group of users of said plurality of users located within a specified proximity to each other user of said group of users;
    determining, by said computer processor based on an altitude, velocity, and a vector of each one of said GPS enabled devices of said group of users, that said group of users is located within said vehicle;
    determining, by said computer processor based on locations of said GPS enabled devices, a position of each user of said group of users with respect to said vehicle;
    modifying, by said computer processor based on driver or passenger roles associated with each said position for each user of said group of users with respect to said vehicle, selected control functions of each said GPS enabled device of said GPS enabled devices; and
    disabling after said modifying, by said computer processor, said GPS enabled devices.

2. The method of claim 1, wherein a first role of said roles is associated with a first user of said users, wherein said first role indicates that said first user is a driver of said vehicle, wherein said first user is associated with a first GPS enabled device of said GPS enabled devices, and wherein said controlling said functions comprises disabling said first GPS device.

3. The method of claim 1, wherein a first user is associated with a first GPS enabled device of said GPS enabled devices, and wherein said method further comprises:
   determining, by said computer processor based on each said position, a speed and direction of travel for each user of said group of users; and
   identifying, by said computer processor based on said speed and direction of travel, said first user as a driver of said vehicle, wherein said controlling said functions comprises disabling said selected functions of said first GPS device.

4. The method of claim 3, wherein said determining that said group of users is located within said specified proximity is further based on said speed and direction of travel for said each user.

5. The method of claim 1, further comprising:
   determining, by said computer processor based on a number of users in said group of users and each said position of each said user, a size of said vehicle.

6. The method of claim 5, further comprising:
   determining, by said computer processor based on said number of users in said group of users, each said position of each said user, and said size of said vehicle, a vehicle type of said vehicle.

7. The method of claim 1, wherein said GPS data comprises GPS coordinates.

8. The method of claim 1, wherein a first role of said roles is associated with a first user of said users, wherein said first role indicates that said first user is a driver of said vehicle, wherein said first user is associated with a first GPS enabled device of said GPS enabled devices, and wherein said controlling said functions comprises modifying user control functions of said first GPS device.

9. The method of claim 1, further comprising:
   providing at least one support service for at least one of creating, integrating, hosting, maintaining, and deploying computer-readable code in the computing system, said code being executed by the computer processor to implement said receiving, said determining said group of users, said determining that said group of user is located in said vehicle, said determining said position, and said controlling.

10. A computing system comprising a computer processor coupled to a computer-readable memory unit, said memory unit comprising instructions that when executed by the computer processor implements a device identification and modification method comprising:
    receiving, via said computer processor by a cache of said computing system from a plurality of GPS enabled devices of a plurality of users, GPS data identifying locations of said GPS enabled devices, where said computing system comprises an integrated computer within a vehicle;
    identifying, by said computer processor based on digital identification input inserted into said cache, each GPS enabled device of said GPS enabled devices;
    refreshing, by said computer processor based on said digital identification input within said cache, said GPS data resulting in updated GPS data identifying updated locations of said GPS enabled devices;
    determining, by said computer processor based on said updated GPS data within said cache and locations of said GPS enabled devices, a group of users of said plurality of users located within a specified proximity to each other user of said group of users;
    determining, by said computer processor based on an altitude, velocity, and a vector of each one of said GPS enabled devices of said group of users, that said group of users is located within said vehicle;
    determining, by said computer processor based on locations of said GPS enabled devices, a position of each user of said group of users with respect to said vehicle;
    modifying, by said computer processor based on driver or passenger roles associated with each said position for each user of said group of users with respect to said vehicle, selected control functions of each said GPS enabled device of said GPS enabled devices; and
    disabling after said modifying, by said computer processor, said GPS enabled devices.

11. The computing system of claim 10, wherein a first role of said roles is associated with a first user of said users, wherein said first role indicates that said first user is a driver of said vehicle, wherein said first user is associated with a first GPS enabled device of said GPS enabled devices, and wherein said controlling said functions comprises disabling said first GPS device.

12. The computing system of claim 10, wherein a first user is associated with a first GPS enabled device of said GPS enabled devices, and wherein said method further comprises:
    determining, by said computer processor based on each said position, a speed and direction of travel for each user of said group of users; and
    identifying, by said computer processor based on said speed and direction of travel, said first user as a driver of said vehicle, wherein said controlling said functions comprises disabling said selected functions of said first GPS device.

13. The computing system of claim 12, wherein said determining that said group of users is located within said specified proximity is further based on said speed and direction of travel for said each user.

14. The computing system of claim 10, wherein said method further comprises:
    determining, by said computer processor based on a number of users in said group of users and each said position of each said user, a size of said vehicle.

15. The computing system of claim 14, wherein said method further comprises:
    determining, by said computer processor based on said number of users in said group of users, each said position of each said user, and said size of said vehicle, a vehicle type of said vehicle.

16. The computing system of claim 10, wherein said GPS data comprises GPS coordinates.

17. The computing system of claim 10, wherein a first role of said roles is associated with a first user of said users, wherein said first role indicates that said first user is a driver of said vehicle, wherein said first user is associated with a first GPS enabled device of said GPS enabled devices, and wherein said controlling said functions comprises modifying user control functions of said first GPS device.

18. A computer program product, comprising a non-transitory computer readable hardware storage device storing a computer readable program code, said computer readable program code comprising an algorithm that when executed by a computer processor of a computer system implements a device identification and modification method, said method comprising:

receiving, via said computer processor by a cache of said computing system from a plurality of GPS enabled devices of a plurality of users, GPS data identifying locations of said GPS enabled devices, where said computing system comprises an integrated computer within a vehicle;

identifying, by said computer processor based on digital identification input inserted into said cache, each GPS enabled device of said GPS enabled devices;

refreshing, by said computer processor based on said digital identification input within said cache, said GPS data resulting in updated GPS data identifying updated locations of said GPS enabled devices;

determining, by said computer processor based on said updated GPS data within said cache and locations of said GPS enabled devices, a group of users of said plurality of users located within a specified proximity to each other user of said group of users;

determining, by said computer processor based on an altitude, velocity, and a vector of each one of said GPS enabled devices of said group of users, that said group of users is located within said vehicle;

determining, by said computer processor based on locations of said GPS enabled devices, a position of each user of said group of users with respect to said vehicle;

modifying, by said computer processor based on driver or passenger roles associated with each said position for each user of said group of users with respect to said vehicle, selected control functions of each said GPS enabled device of said GPS enabled devices; and disabling after said modifying, by said computer processor, said GPS enabled devices.

19. The computer program product of claim 18, wherein a first role of said roles is associated with a first user of said users, wherein said first role indicates that said first user is a driver of said vehicle, wherein said first user is associated with a first GPS enabled device of said GPS enabled devices, and wherein said controlling said functions comprises disabling said first GPS device.

20. The computer program product of claim 18, wherein a first user is associated with a first GPS enabled device of said GPS enabled devices, and wherein said method further comprises:

determining, by said computer processor based on each said position, a speed and direction of travel for each user of said group of users; and identifying, by said computer processor based on said speed and direction of travel, said first user as a driver of said vehicle, wherein said controlling said functions comprises disabling said selected functions of said first GPS device.

* * * * *